US008718862B2

(12) United States Patent
Gwozdek et al.

(10) Patent No.: US 8,718,862 B2
(45) Date of Patent: May 6, 2014

(54) METHOD AND APPARATUS FOR DRIVER ASSISTANCE

(75) Inventors: Thomas M. Gwozdek, Plymouth, MI (US); Matthew Roger DeDona, Northville, MI (US); James A. Lathrop, Saline, MI (US); Venkateswa Anand Sankaran, Farmington Hills, MI (US); Karin Lovett, Novi, MI (US); Steven F. Chorian, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 12/869,032

(22) Filed: Aug. 26, 2010

(65) Prior Publication Data

US 2012/0053782 A1 Mar. 1, 2012

(51) Int. Cl.
*G06F 11/30* (2006.01)
*B60R 25/10* (2013.01)

(52) U.S. Cl.
USPC .................................... 701/29.9; 340/426.12

(58) Field of Classification Search
USPC ........... 701/29.1, 29.2, 29.5, 29.9, 30.8, 30.9, 701/31.3, 31.5, 31.6, 31.9, 33.9, 34.3, 701/FOR. 100, FOR. 105; 180/65.1, 65.21, 180/65.225, 65.265, 65.29, 65.22; 320/109, 320/118; 324/426; 903/903, 904, 907; 340/426.1, 426.12, 426.13, 426.15, 340/426.16, 426.18, 426.19, 426.28, 340/426.29, 426.3, 426.31
See application file for complete search history.

(56) References Cited

U.S. PATENT DOCUMENTS

| | | | | |
|---|---|---|---|---|
| 5,781,125 | A | 7/1998 | Godau et al. | |
| 5,922,041 | A | 7/1999 | Anderson | |
| 6,064,322 | A | 5/2000 | Ohira | |
| 6,337,621 | B1 * | 1/2002 | Ogino et al. | 340/425.5 |
| 6,356,839 | B1 | 3/2002 | Monde et al. | |
| 6,434,455 | B1 | 8/2002 | Snow et al. | |
| 6,553,292 | B2 | 4/2003 | Kokes et al. | |
| 6,598,183 | B1 | 7/2003 | Grieco et al. | |
| 6,603,394 | B2 | 8/2003 | Raichle et al. | |
| 6,611,740 | B2 | 8/2003 | Lowrey et al. | |
| 6,636,790 | B1 | 10/2003 | Lightner et al. | |
| 6,687,587 | B2 | 2/2004 | Kacel | |
| 6,738,697 | B2 | 5/2004 | Breed | |

(Continued)

FOREIGN PATENT DOCUMENTS

| | | | |
|---|---|---|---|
| EP | 0808492 | | 8/1996 |
| JP | 9264819 | A | 10/1997 |
| JP | 11326140 | A | 11/1999 |
| JP | 2006018680 | A | 1/2006 |

OTHER PUBLICATIONS

Introduction to J2534 and Flash Reprogramming, Drew Technologies, Copyright 2009.

(Continued)

*Primary Examiner* — Muhammad Shafi
(74) *Attorney, Agent, or Firm* — Jennifer M. Stec; Brooks Kushman P.C.

(57) ABSTRACT

A method performed by a vehicle computing system includes detecting the triggering of a vehicle sensor indicating an abnormal vehicle condition and determining one or more likely abnormal vehicle conditions associated with the triggering of the sensor. The method also includes accessing a vehicle database to determine one or more pieces of information relating to the one or more abnormal vehicle conditions. The method further includes electronically presenting the one or more pieces of information to a vehicle user.

12 Claims, 5 Drawing Sheets

(56) References Cited

U.S. PATENT DOCUMENTS

| | | | | |
|---|---|---|---|---|
| 6,778,888 | B2 | 8/2004 | Cataldo et al. | |
| 6,978,198 | B2 | 12/2005 | Shi | |
| 7,146,307 | B2 | 12/2006 | Mocek | |
| 7,155,321 | B2 | 12/2006 | Bromley et al. | |
| 7,209,490 | B2 | 4/2007 | Isaac et al. | |
| 7,228,211 | B1 | 6/2007 | Lowrey et al. | |
| 7,232,962 | B2 | 6/2007 | Rynd | |
| 7,277,780 | B2 * | 10/2007 | Meier-Arendt et al. | 701/1 |
| 7,340,365 | B2 | 3/2008 | Wubbena et al. | |
| 7,343,526 | B2 | 3/2008 | Aditham | |
| 7,356,394 | B2 | 4/2008 | Burgess | |
| 7,366,934 | B1 | 4/2008 | Narayan et al. | |
| 7,379,541 | B2 | 5/2008 | Iggulden et al. | |
| 7,487,074 | B2 | 2/2009 | Ohtsu et al. | |
| 7,493,209 | B1 | 2/2009 | Altrichter et al. | |
| 7,522,995 | B2 | 4/2009 | Nortrup | |
| 7,532,962 | B1 | 5/2009 | Lowrey et al. | |
| 7,590,476 | B2 | 9/2009 | Shumate | |
| 7,905,815 | B2 | 3/2011 | Ellis et al. | |
| 7,983,839 | B2 | 7/2011 | Sutardja | |
| 8,024,111 | B1 | 9/2011 | Meadows et al. | |
| 8,103,443 | B2 | 1/2012 | Kantarjiev et al. | |
| 8,126,644 | B2 | 2/2012 | Amano | |
| 8,140,358 | B1 | 3/2012 | Ling et al. | |
| 8,185,299 | B2 | 5/2012 | Fujiwara et al. | |
| 8,219,249 | B2 | 7/2012 | Harrod et al. | |
| 8,285,439 | B2 | 10/2012 | Hodges | |
| 8,315,802 | B2 | 11/2012 | Brown | |
| 8,364,402 | B2 | 1/2013 | Ross et al. | |
| 8,390,473 | B2 | 3/2013 | Krzyzanowski et al. | |
| 8,392,105 | B2 | 3/2013 | Desborough | |
| 2002/0035429 | A1 | 3/2002 | Banas | |
| 2002/0173885 | A1 | 11/2002 | Lowrey et al. | |
| 2003/0034769 | A1 | 2/2003 | Lipscomb et al. | |
| 2003/0036832 | A1 | 2/2003 | Kokes et al. | |
| 2003/0163587 | A1 | 8/2003 | Knight et al. | |
| 2004/0024502 | A1 * | 2/2004 | Squires et al. | 701/33 |
| 2004/0044454 | A1 | 3/2004 | Ross et al. | |
| 2004/0054503 | A1 | 3/2004 | Namaky | |
| 2004/0093134 | A1 * | 5/2004 | Barber et al. | 701/29 |
| 2004/0128071 | A1 | 7/2004 | Schradi | |
| 2004/0172177 | A1 | 9/2004 | Nagai et al. | |
| 2004/0194479 | A1 | 10/2004 | Umebayashi et al. | |
| 2004/0218894 | A1 | 11/2004 | Harville et al. | |
| 2005/0090939 | A1 | 4/2005 | Mills et al. | |
| 2005/0096020 | A1 | 5/2005 | Oesterling | |
| 2005/0097541 | A1 | 5/2005 | Holland | |
| 2005/0192724 | A1 | 9/2005 | Hendry | |
| 2005/0281414 | A1 | 12/2005 | Simon et al. | |
| 2006/0034231 | A1 | 2/2006 | Tailor | |
| 2006/0041348 | A1 | 2/2006 | Liebl et al. | |
| 2006/0130033 | A1 | 6/2006 | Stoffels et al. | |
| 2006/0132291 | A1 | 6/2006 | Dourney, Jr. et al. | |
| 2006/0155437 | A1 * | 7/2006 | Wang et al. | 701/29 |
| 2006/0229777 | A1 | 10/2006 | Hudson et al. | |
| 2006/0253235 | A1 | 11/2006 | Bi et al. | |
| 2007/0121959 | A1 | 5/2007 | Philipp | |
| 2007/0162796 | A1 | 7/2007 | Chan et al. | |
| 2007/0171029 | A1 | 7/2007 | Inbarajan | |
| 2007/0179799 | A1 | 8/2007 | Laghrari | |
| 2008/0015748 | A1 | 1/2008 | Nagy | |
| 2008/0027605 | A1 | 1/2008 | Oesterling | |
| 2008/0027606 | A1 | 1/2008 | Helm | |
| 2008/0082226 | A1 | 4/2008 | Amador et al. | |
| 2008/0140281 | A1 | 6/2008 | Morris et al. | |
| 2008/0147267 | A1 | 6/2008 | Plante et al. | |
| 2008/0162033 | A1 | 7/2008 | Wagner et al. | |
| 2008/0167056 | A1 | 7/2008 | Gilzean et al. | |
| 2008/0167078 | A1 | 7/2008 | Eibye | |
| 2008/0172357 | A1 | 7/2008 | Rechis et al. | |
| 2008/0216067 | A1 | 9/2008 | Viling | |
| 2008/0269975 | A1 | 10/2008 | Bertosa et al. | |
| 2009/0063038 | A1 | 3/2009 | Shrivathsan et al. | |
| 2009/0063045 | A1 | 3/2009 | Figueroa et al. | |
| 2009/0143937 | A1 | 6/2009 | Craig | |
| 2009/0177352 | A1 | 7/2009 | Grau et al. | |
| 2009/0210145 | A1 | 8/2009 | Amano | |
| 2009/0276115 | A1 | 11/2009 | Chen | |
| 2009/0292416 | A1 | 11/2009 | Ubik et al. | |
| 2009/0308134 | A1 | 12/2009 | Pepper | |
| 2009/0326757 | A1 | 12/2009 | Andreasen et al. | |
| 2009/0326991 | A1 | 12/2009 | Wei et al. | |
| 2010/0042287 | A1 | 2/2010 | Zhang et al. | |
| 2010/0042288 | A1 | 2/2010 | Lipscomb et al. | |
| 2010/0056055 | A1 | 3/2010 | Ketari | |
| 2010/0204878 | A1 | 8/2010 | Drew et al. | |
| 2010/0245123 | A1 | 9/2010 | Prasad et al. | |
| 2010/0246846 | A1 | 9/2010 | Burge et al. | |
| 2010/0256861 | A1 | 10/2010 | Hodges | |
| 2010/0262335 | A1 | 10/2010 | Brozovich | |
| 2011/0022422 | A1 | 1/2011 | Taylor | |
| 2011/0041088 | A1 | 2/2011 | Mason et al. | |
| 2011/0046883 | A1 | 2/2011 | Ross et al. | |
| 2011/0190962 | A1 | 8/2011 | Peterson et al. | |
| 2011/0225096 | A1 | 9/2011 | Cho et al. | |
| 2011/0258044 | A1 | 10/2011 | Kargupta | |
| 2011/0276218 | A1 | 11/2011 | Dwan et al. | |
| 2011/0276219 | A1 | 11/2011 | Swaminathan et al. | |
| 2012/0029762 | A1 | 2/2012 | Ubik et al. | |
| 2012/0030512 | A1 | 2/2012 | Wadhwa et al. | |
| 2012/0053782 | A1 | 3/2012 | Gwozdek et al. | |
| 2012/0072055 | A1 | 3/2012 | Barlsen et al. | |
| 2012/0075092 | A1 | 3/2012 | Petite et al. | |
| 2012/0294238 | A1 | 11/2012 | Uhler | |

OTHER PUBLICATIONS

DrewTech gets you on the Bus, article printed from www.drewtech.com, Dec. 16, 2009.

The CarDAQ-Plus Advantage, Drew Technologies, Inc.

Software, Pass Thru Pro II, J2534 Flash Reprogramming, printed from buy1.snapon.com, Dec. 3, 2009.

Integrated Diagnostic System (IDS), Ford, Lincoln, Mercury.

Pegisys PC Diagnostic System, PC-based J2534 Reprogramming & Scan Tool, printed from www.otctools.com.

CarDAQ-Plus, Drew Technologies, Inc.

Dynetics Vehicle Data Recorder Models DVG-II and WDVG-II (2009) printout from www.dynetics-ia.com.

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

* cited by examiner

METHOD AND APPARATUS FOR DRIVER ASSISTANCE

BACKGROUND AND SUMMARY

Many modern vehicles on the road come equipped with navigation display capability. In addition to showing a route to be traveled, the navigation display can output information such as a radio station, fuel information, odometer information, etc. Often times, the display is also user-interactive, in a touch or button/dial-controlled manner. Using the user interaction options, the user can select various features displayed on the navigation display. For example, a user can input a route-to-be-traveled, select a vehicle information setting for more information, etc.

Additionally or alternatively, a vehicle may have an audio output of various vehicle-related and/or route information for a user. For example, if the vehicle did not have a navigation display, the vehicle audio system may recite a menu from which the user can physically or verbally select an option. Even if the vehicle does have a navigation display, the menu may still be recited verbally in order to prevent the driver from having to interact with a visual display while driving.

As these and other vehicle systems grow more complex, users may begin to lack a fundamental understanding of these features. Typically, a user-manual of some sort is provided with a vehicle. The vehicle manual will often attempt to address typical vehicle systems in an explanatory manner. These manuals, however, may contain over a hundred pages of information and be difficult for users to navigate. If a vehicle condition occurs while a user is driving, it may not be feasible to check the manual at all, at least until the user parks the vehicle.

In a first illustrative embodiment, a method performed by a vehicle computing system includes detecting the triggering of a vehicle sensor indicating an abnormal vehicle condition and determining one or more likely abnormal vehicle conditions associated with the triggering of the sensor.

The method also includes accessing a vehicle database to determine one or more pieces of information relating to the one or more abnormal vehicle conditions. The method further includes electronically presenting the one or more pieces of information to a vehicle user.

In another illustrative embodiment, a vehicle computing apparatus includes detecting programmed logic circuitry to detect the triggering of a vehicle sensor indicating an abnormal vehicle condition. The vehicle computing system further includes determining programmed logic circuitry to determine one or more likely abnormal vehicle conditions associated with the triggering of the sensor.

The system also includes accessing programmed logic circuitry to access a vehicle database to determine one or more pieces of information relating to the one or more abnormal vehicle conditions.

Finally, the system includes presenting programmed logic circuitry to electronically present the one or more pieces of information to a vehicle user.

In yet a third illustrative embodiment a server enacted method of delivering a message includes determining a plurality of vehicles qualifying for message delivery.

The server enacted method also includes determining which of the plurality of vehicles is connected to a network with which the server is in communication and sending the message to the vehicles connected to the network.

The method further includes receiving a confirmation from one or more vehicles that the message was received and registering a receipt-of-message for each vehicle from which a confirmation was received.

DETAILED DESCRIPTION

Figure 1:
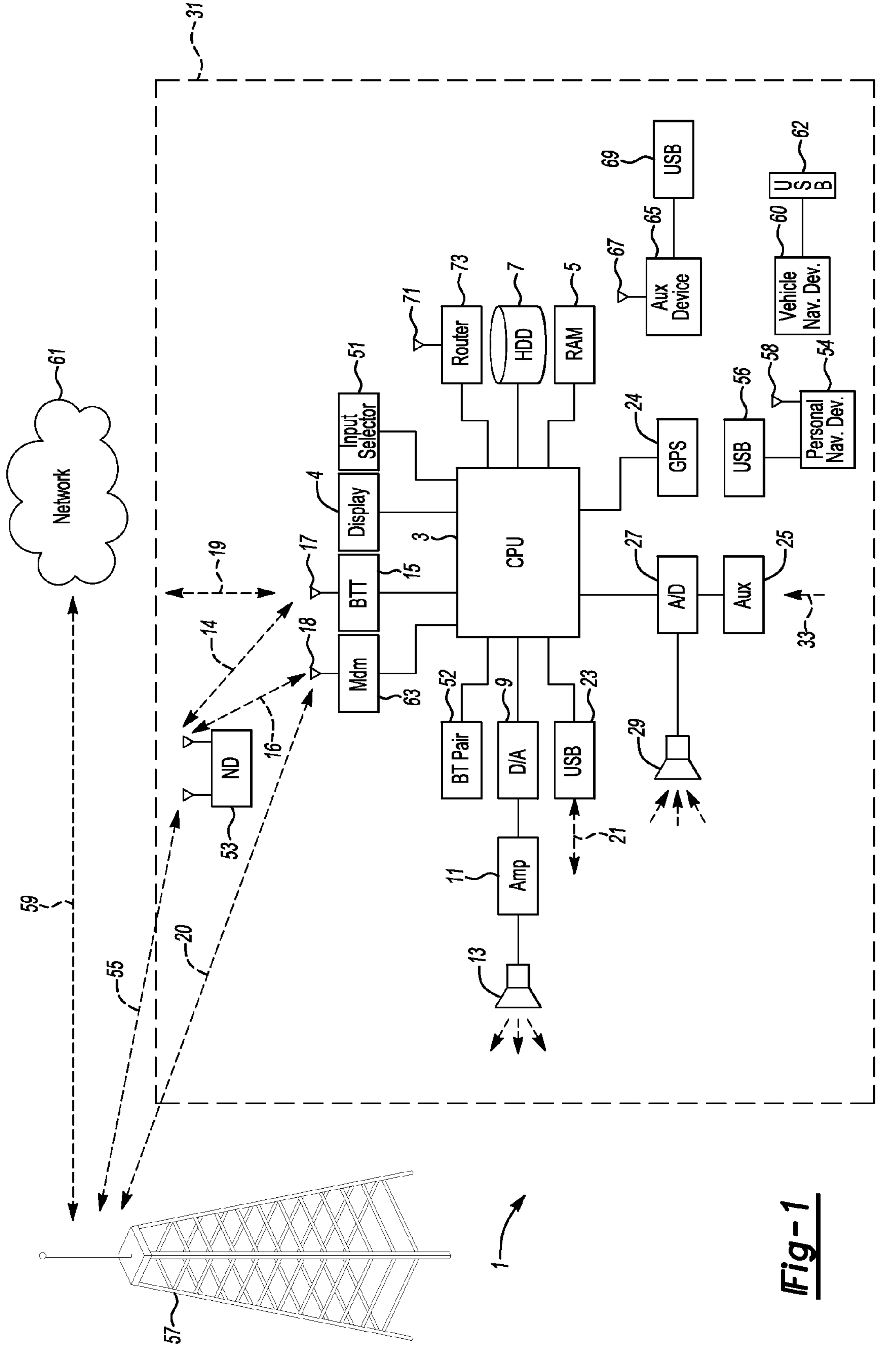
FIG. 1 illustrates an example block topology for a vehicle based computing system.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Exemplary communication between the nomadic device and the BLUETOOTH Transceiver is represented by signal 14.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
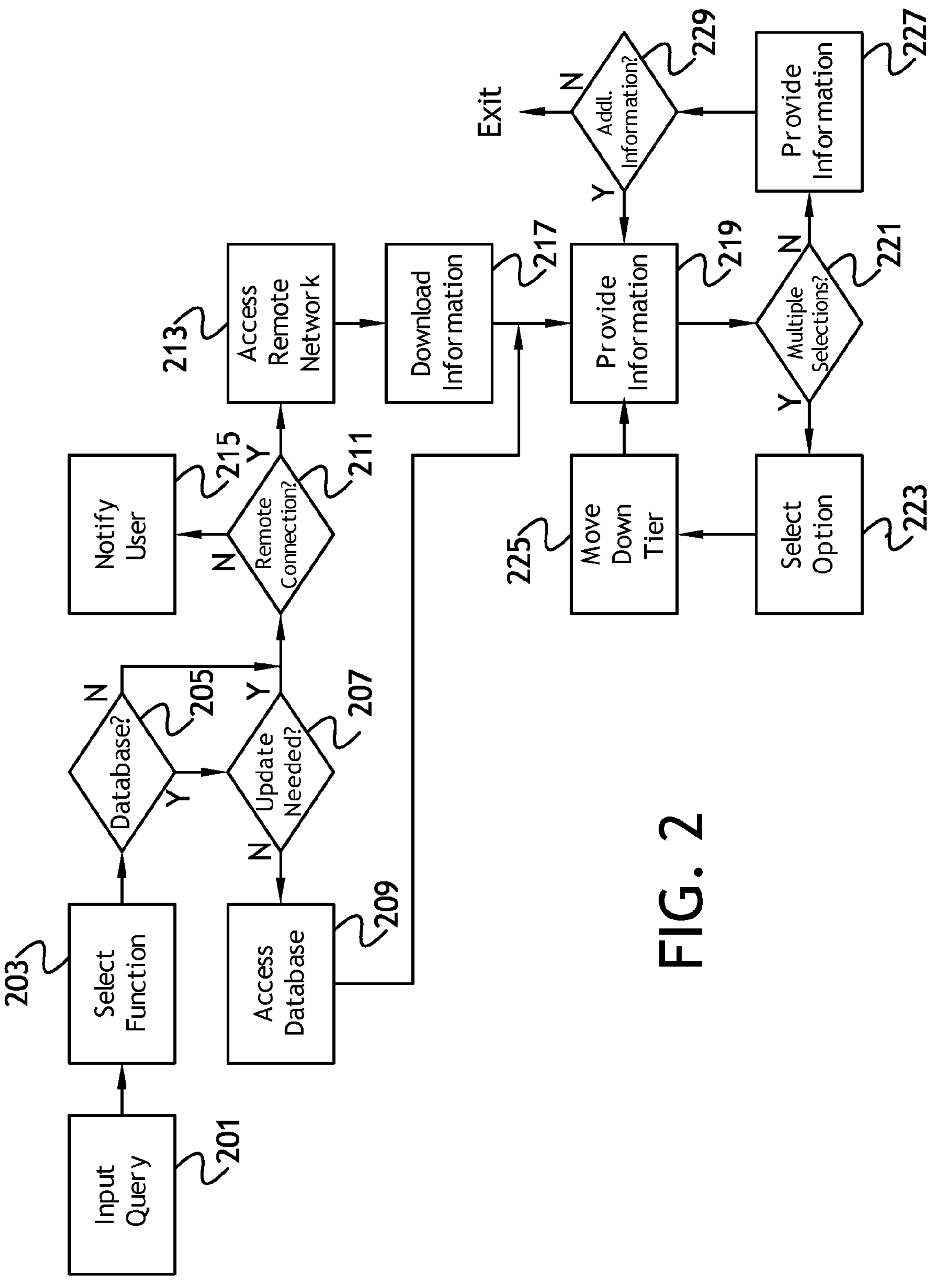
FIG. 2 shows an illustrative embodiment of a process for providing vehicle information in response to a user query.

FIG. 2 shows an illustrative embodiment of a process for providing vehicle information in response to a user query. In a first illustrative embodiment, the user accesses a digital menu of one or more frequently asked questions about a user selected topic.

For example, if the user wanted to know more about the fuses in a car, perhaps in response to a vehicle system apparently malfunctioning, the user might input "fuses." This input could be done physically, through a touch menu or other physical input, or the input could be done verbally through a microphone connected to the vehicle system.

Once the user has input a query 201, the user then can select a function 203, such as a search function. If the vehicle has a local database 205 of responsive information that may address the search, the vehicle system can access the local database 209. If the local database needs updating 207, or if no local database exists 205, the vehicle computing system may check to see if a connection exists with a remote network 211. The vehicle system may be connected to a remote database 213 through a wireless network connection, through a connection with a wireless device, etc. If no connection to a remote database is available, the user may be notified of the failure to connect 215.

Once a connection to the remote database is established 213, necessary information may be downloaded 217. This information can include, but is not limited to, responses to the user's query, updates to a local database, etc.

After any necessary information is downloaded, if needed, the information may be provided to the user 219. This provision of information could be in the form of a visual display or through the vehicle's speaker system. In another alternative embodiment, the information can even be provided on a display of a device remote from the vehicle computing system and connected to the vehicle computing system (in a wired or wireless manner).

In one illustrative embodiment, the information is provided in the form of frequently asked questions (FAQS) or a similar manner. That is, the information is information commonly requested on the subject which the user queried. While the information may not necessarily be in the form of hypothetical questions (although it may be), in this illustrative embodiment, it does have the common theme of being typically requested information. This may assist the user in finding commonly desired information quickly and easily.

If the information is provided as a plurality of pieces of information or questions 221, the user may have the option to select a particular one of the pieces of information for further information 223. In this manner, the user can drill-down to a desired answer/question/fact.

As the user selects drill-down options 225, the user may be provided with further options 221, 223 if the selected information leads to further choices, or the user may have an answer/fact/etc. displayed 227. Once the user has processed the information requested, the system may query the user as to whether or not additional information is desired 229. In this illustrative embodiment, if additional information is desired the system will return to the original list of choices 219. In another illustrative embodiment, the system could present the most recently selected list of choices for new selection, or an option to move up one level, restart with the original query, etc.

Figure 3:
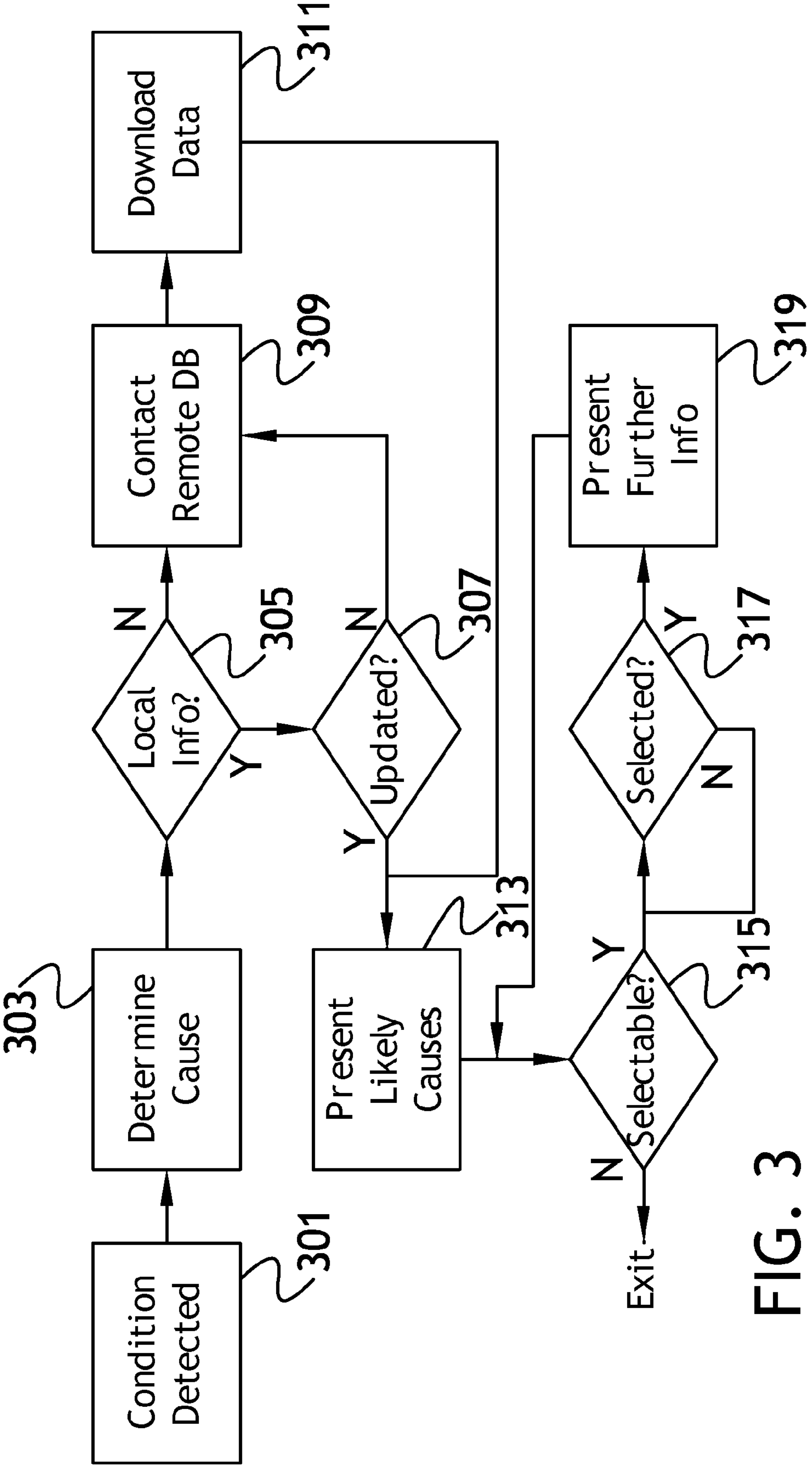
FIG. 3 shows an illustrative embodiment of a process for providing vehicle information in response to a vehicle condition.

FIG. 3 shows an illustrative embodiment of a process for providing vehicle information in response to a vehicle condition. In this illustrative example, a vehicle computing system is connected to one or more vehicle sensors and/or information systems. These sensors can detect anomalies in the vehicle's condition, weather conditions, road conditions, even potentially health or wellness monitors connected to a passenger (or other wireless signals).

In this exemplary embodiment, the vehicle computing system receives a signal from a connected sensor or information system 301. With the variety of computerized vehicle systems and vehicle sensors in communication with vehicle computer (s), it may be possible to easily diagnose a likely problem in response to a sensor. For example, the conditions could be, but are not limited to, a low tire pressure, a low oil indicator, a low fuel indicator, a fuse out indicator, etc.

In response to the signal, a vehicle computing system determines a likely condition associated with the sensor signal detection 303. Once the likely condition (or conditions) is known, the vehicle computing system checks to see if a local database has information on this condition 305. If there is no local database, or if the local database needs updating 307, the vehicle computing system may contact a remote database 309 to obtain an answer/update 311.

If the database is present in the vehicle computing system and is updated (or if the needed information has been obtained from a remote network), the vehicle computing system may present one or more likely causes triggering the sensor 313.

In this illustrative embodiment, the vehicle computing system has one or more methods of receiving user input (e.g., without limitation, touchscreen, microphone, etc.). If the presented information has selectable features 315 (e.g., without limitation, the information could be a list of likely problems or the information could have selectable portions therein) the display persists until a feature is selected 317. Once the feature is selected, a further information set is presented 319 (which may also have selectable features).

Figure 4:
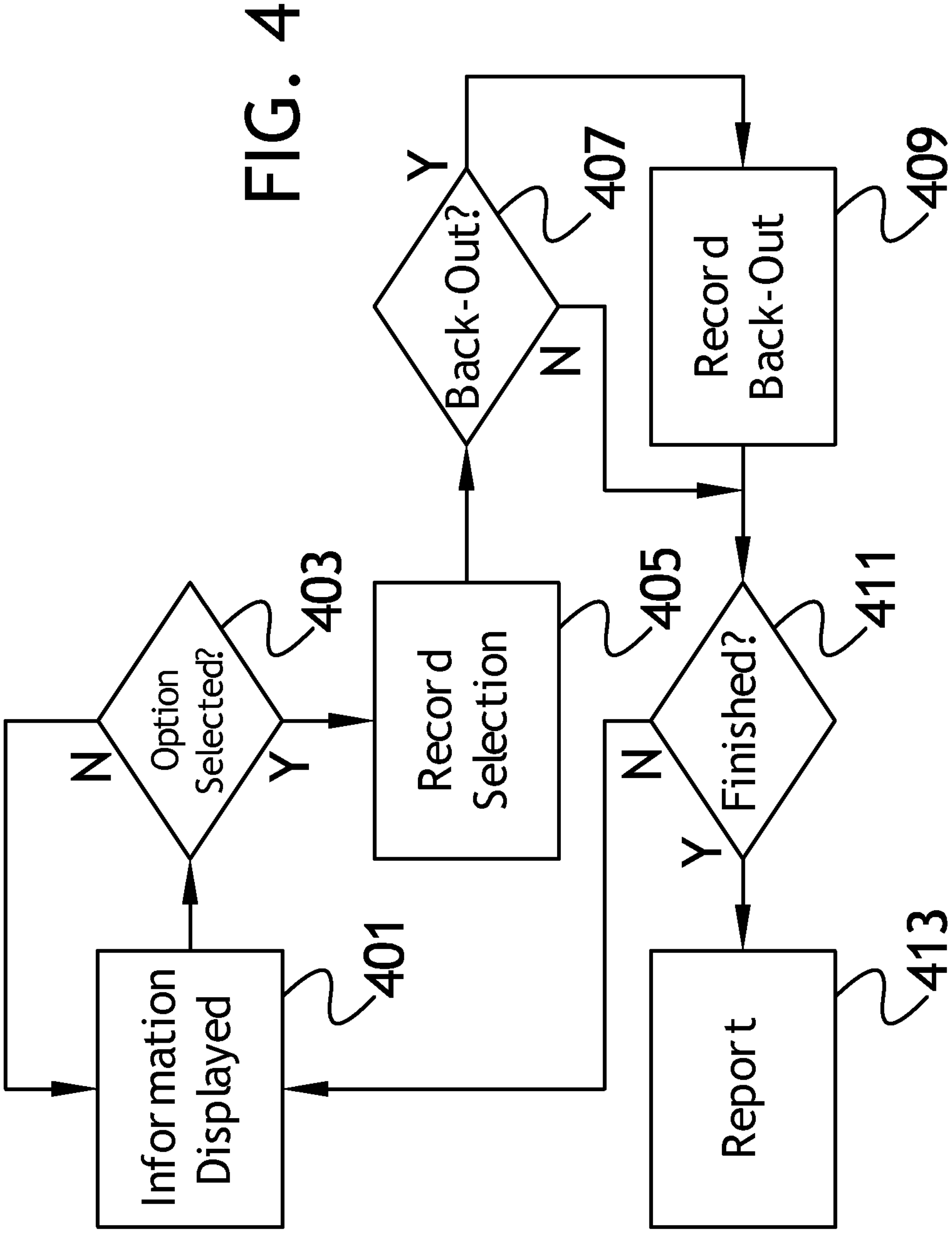
FIG. 4 shows an illustrative update process for updating a remote database based on user data.

FIG. 4 shows an illustrative update process for updating a remote database based on user data. In at least one illustrative embodiment, the data provided to a user in response to a query or in response to a vehicle sensor trigger detection is sorted based on the information that the majority of users find useful.

Since users may not want to rate or respond to queries on the usefulness of particular information (although they may be provided with this option), in this illustrative embodiment, the information is ranked based on what information is most commonly selected by users in response to queries or vehicle sensor triggers.

For example, if a user input the query "tire" a variety of information could be presented. "Tire size", "tire pressure", "tire life", "spare tire", etc.

If the most commonly selected option was "spare tire", followed by, for example, "tire pressure", then these two pieces of information would lead the list of possible selections in that order. In this manner, the information most likely (statistically) to be usable by a user is presented first.

If a vehicle sensor goes off, the information could be reordered based on information commonly selected when that sensor is triggered. For example, a low-tire pressure warning may cause the selection of "tire pressure" most commonly, followed by "spare tire" (in the event the low pressure is due to a flat tire).

In another illustrative embodiment, the information could be ordered based on a selection order chosen by users of that specific vehicle. Or, for example, the information could be ordered based on aggregate selection, unless a local selection ordering overrides the aggregate selection ordering.

One example of updating a remote database is shown with respect to FIG. 4. In this illustrative embodiment, a user has already requested information and information is being displayed 401. As long as no option is selected 403, the information display persists.

Once an option is selected 403, the vehicle computing system records the selection of the option (indicating that it was at least initially appealing to a user) 405. If, subsequent to the selection of an option, the user backs-out of the menu selection 407, the back-out is also recorded 409. Using information such as this (and any other recorded information, such as, but not limited to, user rating, surveys, time spent perusing an option, etc.), when the user is finished with the information 411, the system can report the statistics to a remote network 413.

The remote network can compile the statistics and use the aggregate statistics to determine an order in which information may be desirably presented. Thus, updates to local vehicle databases may not even be in the form of additional data, but may rather simply be an instruction to re-order a particular set of information. In this manner, any time a query is entered or a sensor is triggered, the user is presented with the most statistically useful information relating to the request first.

Figure 5:
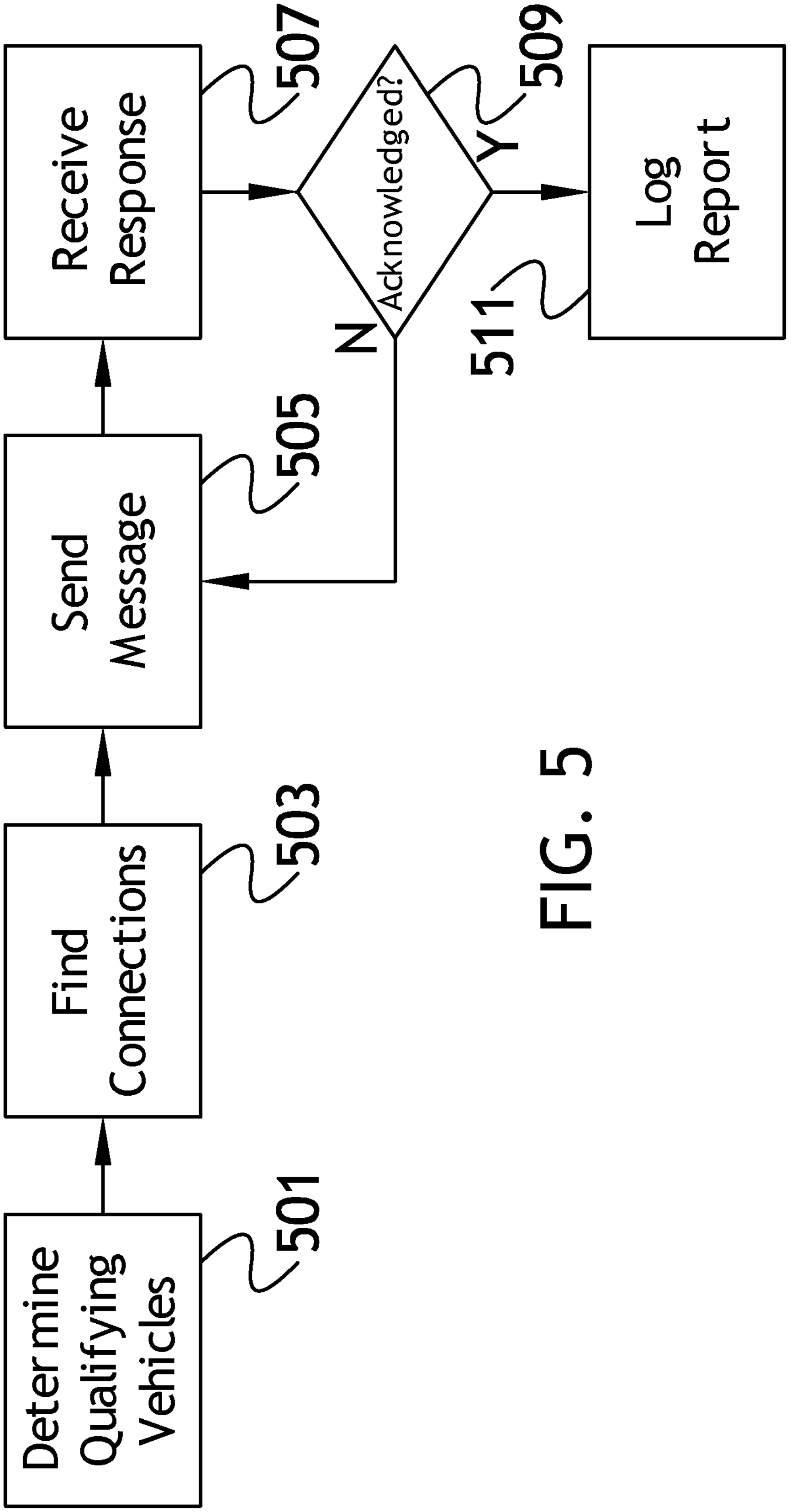
FIG. 5 shows an illustrative example of dynamic provision of a critical vehicle update.

FIG. 5 shows an illustrative example of dynamic provision of a critical vehicle update. In this illustrative embodiment, a vehicle computing system in communication with a remote network is notified that a critical update (such as, but not limited to, a recall) is needed for a driver.

One or more servers on the remote network determines which vehicles (from a registered vehicle database) should be notified of an update condition 501. The server then determines which of the sub-group of vehicles are currently in communication with a remote network to which the server is also in communication 503.

The server (or a different server) then sends the critical update to all corresponding vehicle computing systems currently in communication with the remote network 505 and waits for a response 507, 509. If a response is received 509, the system can log that a notification was sent at a particular time and date and confirmed by a vehicle user 511. If no response is received, the server can continue to send the update 507 until a confirmation of receipt is obtained.

When the vehicle computing system receives the update from the remote server, the vehicle computing system can notify the user via a display or a vehicle audio system. The notification may persist until the user acknowledges the notification, at which point an acknowledgement is transmitted back to the remote server. In this manner, it can be assured that a large number or all of the users of a particular vehicle have received the critical update/message/recall notice/etc.

What is claimed:

1. A method performed by a vehicle computing system comprising:

detecting the triggering of a vehicle sensor indicating an abnormal vehicle condition;

determining one or more likely abnormal vehicle conditions associated with the triggering of the sensor;

accessing a vehicle database to determine one or more pieces of information relating to the one or more abnormal vehicle conditions; ordering the information based on statistically relevant ordering as determined by an ordering stored on at a location on a remote network, and based at least in part on previous selections of similar information by users of a vehicle housing a vehicle computing system; and electronically presenting the one or more pieces of information to a vehicle user.

2. The method of claim 1, wherein the vehicle database is stored locally in a memory located in the vehicle.

3. The method of claim 1, wherein the vehicle database is stored at a remote network location, and wherein the vehicle computing system is operable to communicate with the remote network.

4. The method of claim 1, wherein the electronically presenting includes presenting a visual display of the information.

5. The method of claim 4, wherein at least some portion of the visually presented information is user selectable, wherein selection of the some portion of information results in further presentation of information relating to the selected portion.

6. The method of claim 1, wherein the electronically presenting includes audibly presenting the information.

7. A vehicle computing apparatus comprising:

detecting programmed logic circuitry to detect the triggering of a vehicle sensor indicating an abnormal vehicle condition;

determining programmed logic circuitry to determine one or more likely abnormal vehicle conditions associated with the triggering of the sensor;

accessing programmed logic circuitry to access a vehicle database to determine one or more pieces of information relating to the one or more abnormal vehicle conditions; ordering programmed logic circuitry to order the information based on a statistically relevant ordering as determined by an ordering stored on at a location on a remote network and based on a statistically relevant ordering as determined locally based at least in part on previous selections of similar information by users of a vehicle housing a vehicle computing system; and presenting programmed logic circuitry to electronically present the one or more pieces of information to a vehicle user.

8. The apparatus of claim 7, wherein the vehicle database is stored locally in a memory located in the vehicle.

9. The apparatus of claim 7, wherein the vehicle database is stored at a remote network location, and wherein the vehicle computing system is operable to communicate with the remote network.

10. The apparatus of claim 7, wherein the electronically presenting includes presenting a visual display of the information.

11. The apparatus of claim 10, wherein at least some portion of the visually presented information is user selectable, wherein selection of the some portion of information results in further presentation of information relating to the selected portion.

12. The apparatus of claim 7, wherein the electronically presenting includes audibly presenting the information.

* * * * *